United States Patent [19]

Ohkumo et al.

[11] Patent Number: 5,267,544
[45] Date of Patent: Dec. 7, 1993

[54] CRANK ANGLE AND CYLINDER NUMBER DETECTING SYSTEM AND METHOD FOR INTERNAL COMBUSTION ENGINE

[75] Inventors: Hiroya Ohkumo; Syuuzi Miyama, both of Tokyo; Masakatsu Fujishita; Makoto Tamura, both of Ibaragi, all of Japan

[73] Assignees: Fuji Jukogyo Kabushiki Kaisha; Hitachi, Ltd., both of Tokyo, Japan

[21] Appl. No.: 948,388

[22] Filed: Sep. 21, 1992

[30] Foreign Application Priority Data

Sep. 30, 1991 [JP] Japan ................................. 3-278587

[51] Int. Cl.⁵ .............................................. F02D 45/00
[52] U.S. Cl. ................................... 123/414; 123/478; 123/643
[58] Field of Search ................. 123/414, 478, 617, 643

[56] References Cited
U.S. PATENT DOCUMENTS

| | | |
|---|---|---|
| 4,355,613 | 10/1982 | Rode et al. ........................ 123/414 |
| 4,519,362 | 5/1985 | Arakawa et al. .................. 123/414 |
| 4,856,489 | 8/1989 | Ozawa ............................... 123/643 |
| 4,972,818 | 11/1990 | Nomura et al. .................... 123/414 |
| 5,052,358 | 10/1991 | Fukui .............................. 123/643 X |
| 5,056,485 | 10/1991 | Kobayashi et al. ................. 123/414 |
| 5,099,811 | 3/1992 | Frantz et al. ................... 123/414 X |

FOREIGN PATENT DOCUMENTS 1-219341 9/1989 Japan .
2058358 4/1981 United Kingdom .

Primary Examiner—Tony M. Argenbright
Attorney, Agent, or Firm—Martin A. Farber

[57] ABSTRACT

A crank angle and cylinder number detecting system for an engine has a disc secured to a camshaft of the engine and, a plurality of projections are formed on a periphery of the disc. A sensor is provided adjacent the disc so as to produce pulses. A pattern of interval arrangement of pulses is determined. From the determined pattern, a crank angle of the engine and a cylinder number are precisely determined in a short time.

5 Claims, 9 Drawing Sheets

CRANK ANGLE AND CYLINDER NUMBER DETECTING SYSTEM AND METHOD FOR INTERNAL COMBUSTION ENGINE

BACKGROUND OF THE INVENTION

The present invention relates to a system for detecting an angular position of a crankshaft and a specific cylinder of an engine for a motor vehicle, and to a method thereof.

Recently, electronic control systems are used for controlling various components of the engine, such as a fuel injector and a spark plug. The timings of fuel injection and ignition in each cylinder are determined based on crank angle and cylinder number. Accordingly, a crank angle sensor and a cylinder number sensor are provided to detect the crank angle and the cylinder number.

Generally, the sensors are disposed adjacent a disc secured on a camshaft and/or a crankshaft of the engine. Sensing means detect the crank angle and the cylinder number by projections on the periphery of the disc, and generate a crank angle signal and a cylinder discriminating signal in a form of pulse.

In another detecting system, the disc for detecting the crank angle is mounted on the crankshaft and the disc for discriminating the cylinder is mounted on the camshaft. Two discs are necessary in these sensors for detecting the crank angle and the cylinder number, thereby increasing manufacturing cost and complicating the control system.

Japanese Patent Application Laid-Open 1-219341 discloses a detecting system where the crank angle and the cylinder number is determined with a single sensor. The detecting system generates a plurality of reference pulses in one revolution of the disc. The number of the pulses corresponds to the number of the cylinders provided in the engine. A cylinder discriminating pulse is generated after one of the reference pulses is generated. The time intervals between the pulses are measured to obtain a ratio between each interval and the last time interval. The ratio is compared with a predetermined reference value in order to determine whether the latest pulse is the reference pulse or a cylinder discriminating pulse.

However, since the reference pulse is generated once for each cylinder, when the engine speed rapidly increases at acceleration, the ignition timing determined by the reference pulse may be retarded. To a contrary, during the decrease of the engine speed at deceleration, the timing is advanced too much. Thus, the ignition timing is not accurately controlled.

In order to improve the accuracy of the ignition timing control, it has been proposed to provide a detecting system where a plurality of pulses are generated for each cylinder. The intervals between pulses generated at predetermined crank angles of a predetermined cylinder are measured, and the crank angles are determined based on the ratio thereof. However, when the engine speed rapidly changes at acceleration, deceleration and at cranking for starting the engine, the crank angle is erroneously determined. In order to prevent the error, the discrimination of the cylinder number is not completed until several cylinder discriminating pulses are generated, resulting in delaying the decision.

SUMMARY OF THE INVENTION

An object of the present invention is to provide a system for quickly determining a crank angle and discriminating the cylinder number in accordance with a pulse signal fed from one sensor.

According to the present invention, there is provided a crank angle and cylinder number detecting system for an engine, having a camshaft, a rotary member coaxially connected to an end of the camshaft, a detector for detecting an angular position of the rotary member and for producing a pulse signal, and control means responsive to the pulse signal and engine operating condition signals from various sensors for deciding injection timing of fuel from an injector into each cylinder.

The system comprises a plurality of projections provided on the periphery of the rotary member and unequally spaced from each other, and calculating means responsive to the pulse signal for calculating a crank angle of the engine and for discriminating the cylinder number so as to precisely control the injection timing even when engine speed suddenly fluctuates.

In an aspect of the injection, the three projections are unequally spaced for deciding the crank angle and one projection is for discriminating the cylinder number.

These and other objects and features of this invention will become understood from the following description with reference to the accompanying drawings.

DETAILED DESCRIPTION OF THE PREFERRED EMBODIMENTS

Figure 1:
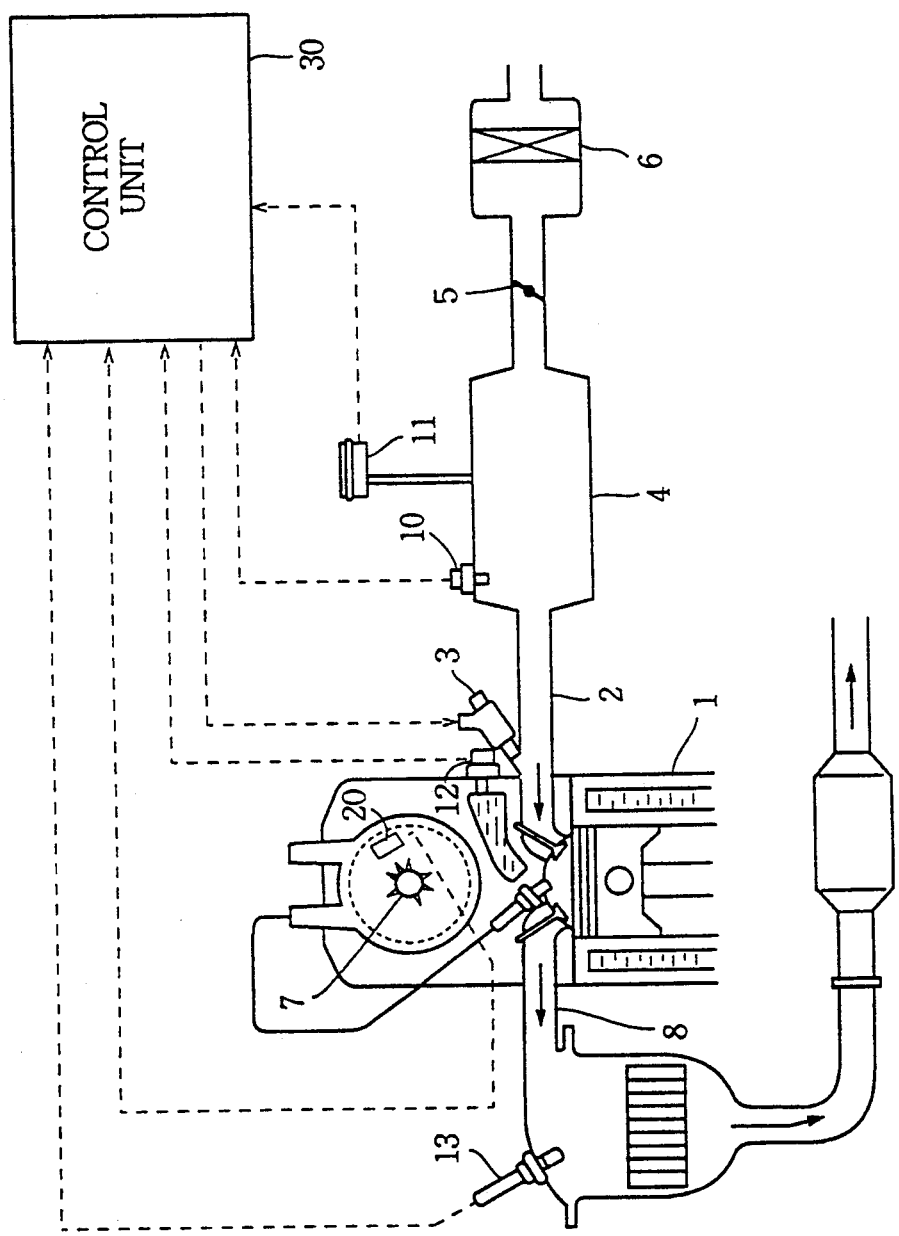
FIG. 1 schematically shows an automotive engine to which the present invention is applied.

Referring to FIG. 1, a four-cylinder internal combustion engine 1 for a motor vehicle is supplied with air through an air cleaner 6, a throttle valve 5, a collector chamber 4, and an intake pipe 2, after mixing with fuel injected from an injector 3 mounted in the intake pipe 2. The exhaust gas is discharged through an exhaust passage 8.

An intake pipe pressure sensor 11 and an intake air temperature sensor 10 are provided on the collector chamber 4 to detect the pressure in the pipe 2 and the temperature of the intake air, respectively. A coolant temperature sensor 12 is mounted on a jacket of the engine 1. An $O_2$-sensor 13 is provided in the exhaust passage 8. Output signals of the sensors 10 to 13 are applied to a control unit 30 comprising a microcomputer.

The control unit 30 is also applied with an output signal from a crank angle detecting device 20 disposed adjacent a camshaft 7. The device 20 comprises a rotary disk 21 which rotates once while the crankshaft rotates twice. The crank angle detecting device 20 detects the crank angle for a cylinder to be injected with fuel as described later. The control unit 30 determines a fuel injection quantity in accordance with the output signals of the sensors 10 to 13, thereby applying a control signal corresponding to the fuel injection quantity to the injector 3 at a timing based on the crank angle detected by the crank angle detecting device 20.

Figure 2:
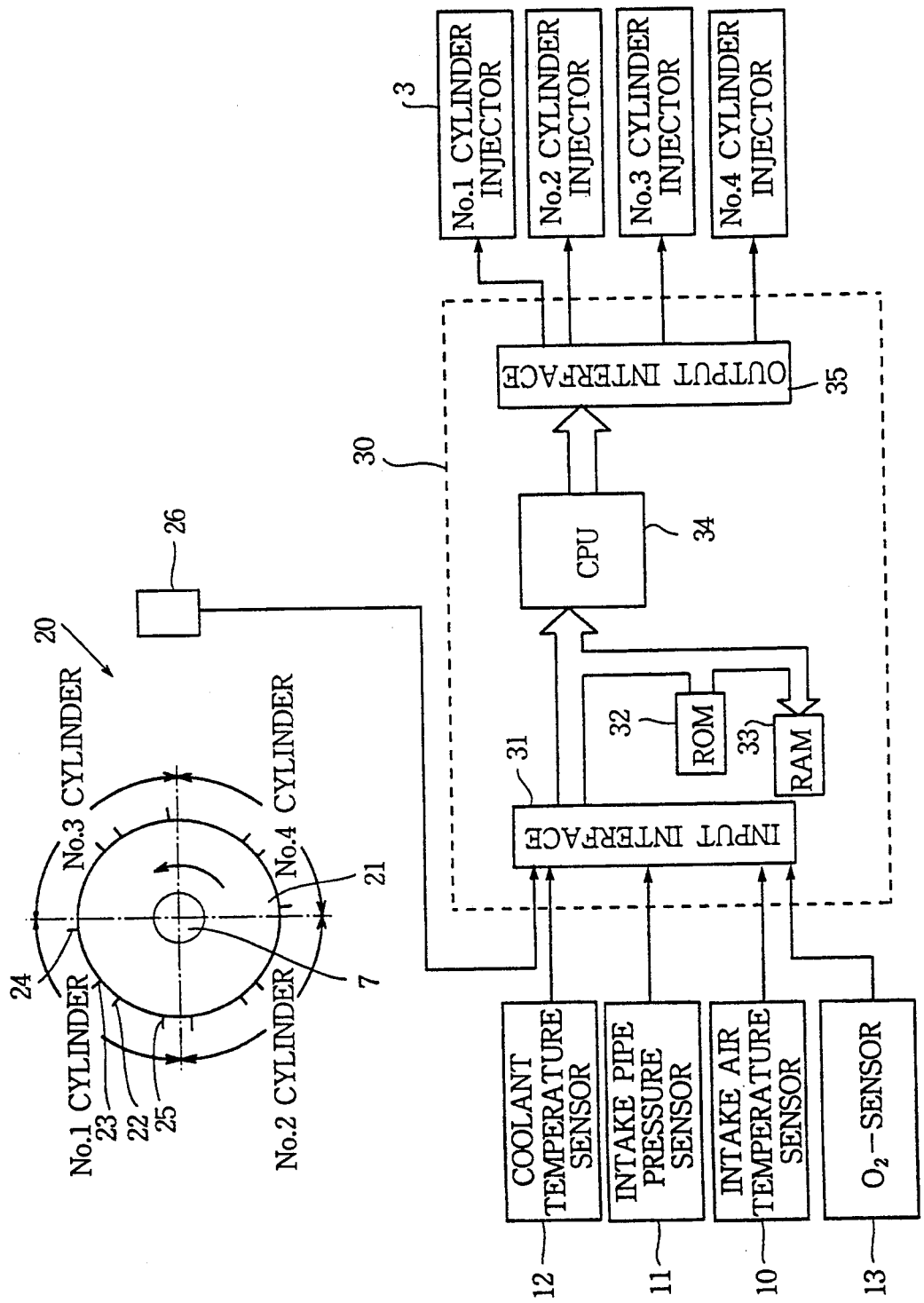
FIG. 2 is a block diagram of a detecting system of the present invention.

Referring to FIG. 2, the control unit 30 comprises a CPU 34, ROM 32, RAM 33, an input interface 31 and an output interface 35, which are connected to each other through a bus line. The input interface 31 having an A/D converter is applied with output signals from the intake air temperature sensor 10, intake pipe pressure sensor 11, coolant temperature sensor 12 and the $O_2$-sensor 13. The CPU 34 calculates the fuel injection quantities in accordance with the signals so that the output interface 35 applies fuel injection signals to injectors 3 provided in the No. 1 to No. 4 cylinders, respectively.

Figure 3:
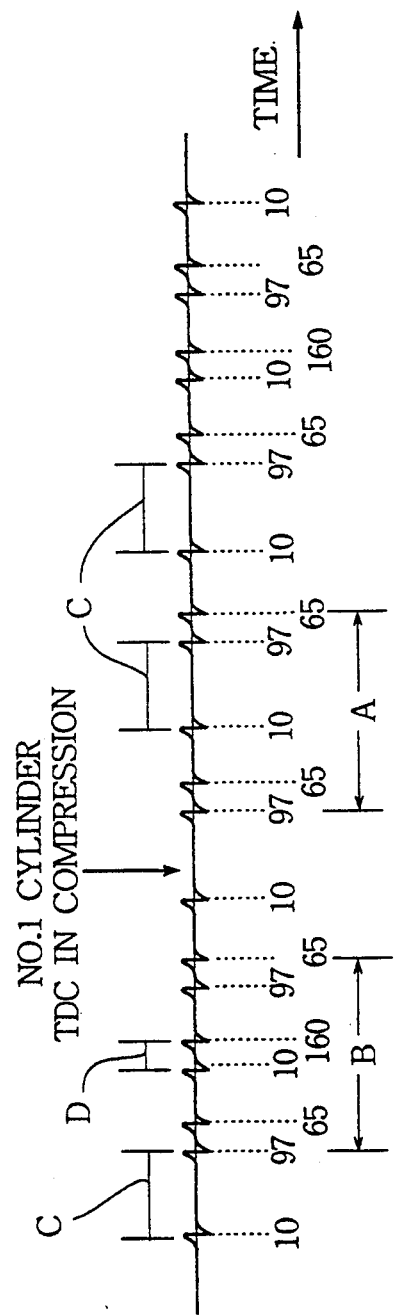
FIG. 3 is a graph showing a pulse signal applied from a crank angle sensor.

The crank angle detecting device 20 comprises the rotary disc 21 securely mounted on the camshaft 7 and having a plurality of projections on the periphery thereof, and an electromagnetic pickup 26. The disc 21 is divided into four sectors so that the angle of each sector corresponds to a period between the top dead center and the bottom dead center of the corresponding cylinder. The sectors are arranged in the order of No. 1, No. 3, No. 4, and No. 2 cylinders in the clockwise direction, namely in the order in which the cylinders are ignited. Each sector has three crank angle projections 22, 23 and 24 disposed unequidistantly at positions of 97 degrees, 65 degrees and 10 degrees before top dead center (BTDC) in the compression stroke. A cylinder discriminating projection 25 is formed in the sector for the No. 1 cylinder at the position of 160 degrees BTDC. Since the camshaft 7 rotates half the rotation of the crankshaft, the projections 22 to 25 are positioned at half of the degrees indicated above. The electromagnetic pickup 26 detects the projections 22 to 25, thereby applying pulse signals to the control unit as shown in FIG. 3.

Figure 8:
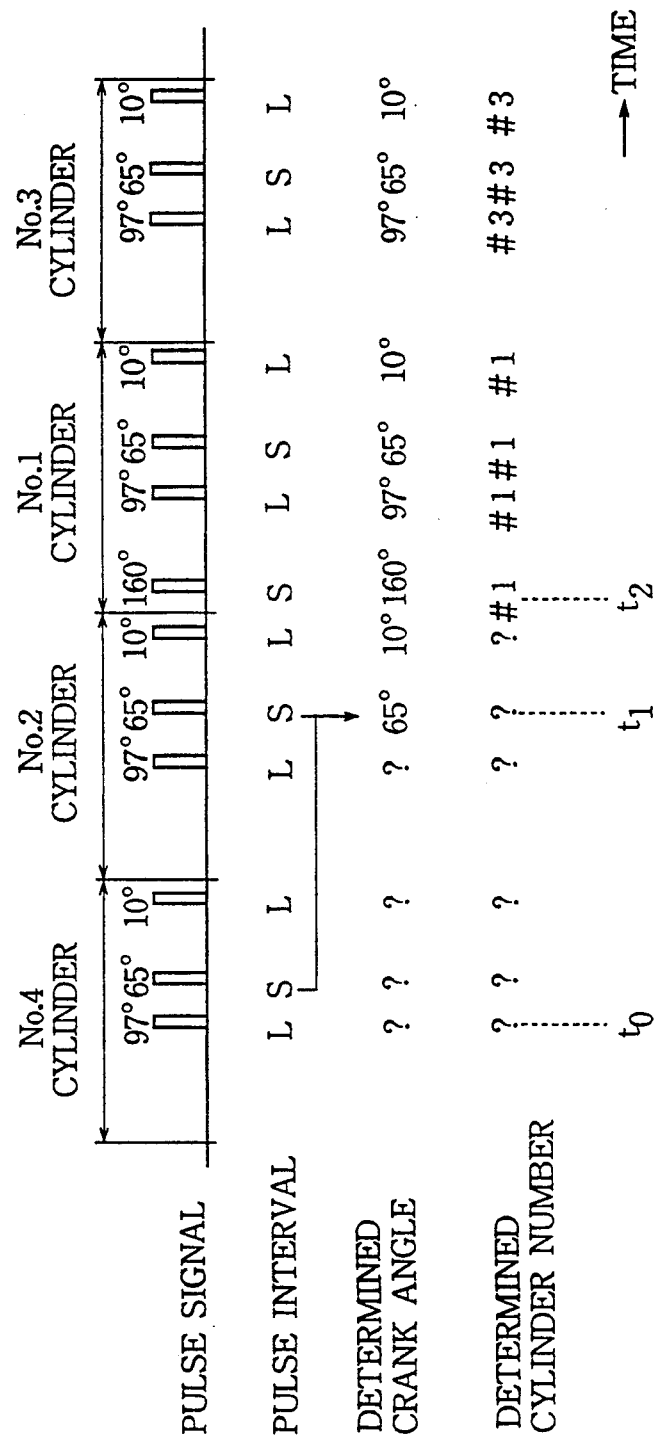
FIGS. 8 and 9 are timecharts for explaining the operation of the present invention.

The pulse signal from the electromagnetic pickup 26 is applied to the input interface 31 of the control unit 30 where the signal is shaped into a waveform as shown in FIG. 8. When the pulse signal is applied to the CPU 34, an interrupt routine for determining the crank angle is executed. When a certain pulse is determined as being produced at the crank angle of 65 degrees BTDC, a routine for calculating the quantity of fuel to be injected to the corresponding cylinder is started, thereby calculating an optimum fuel injection quantity based on the signals from the sensors 10 to 13. Thereafter, the injector 3 injects fuel in the determined cylinder.

The routine for determining the crank angle and discriminating the cylinder is described hereinafter with reference to the flowcharts of FIGS. 4 to 7.

Figure 4:
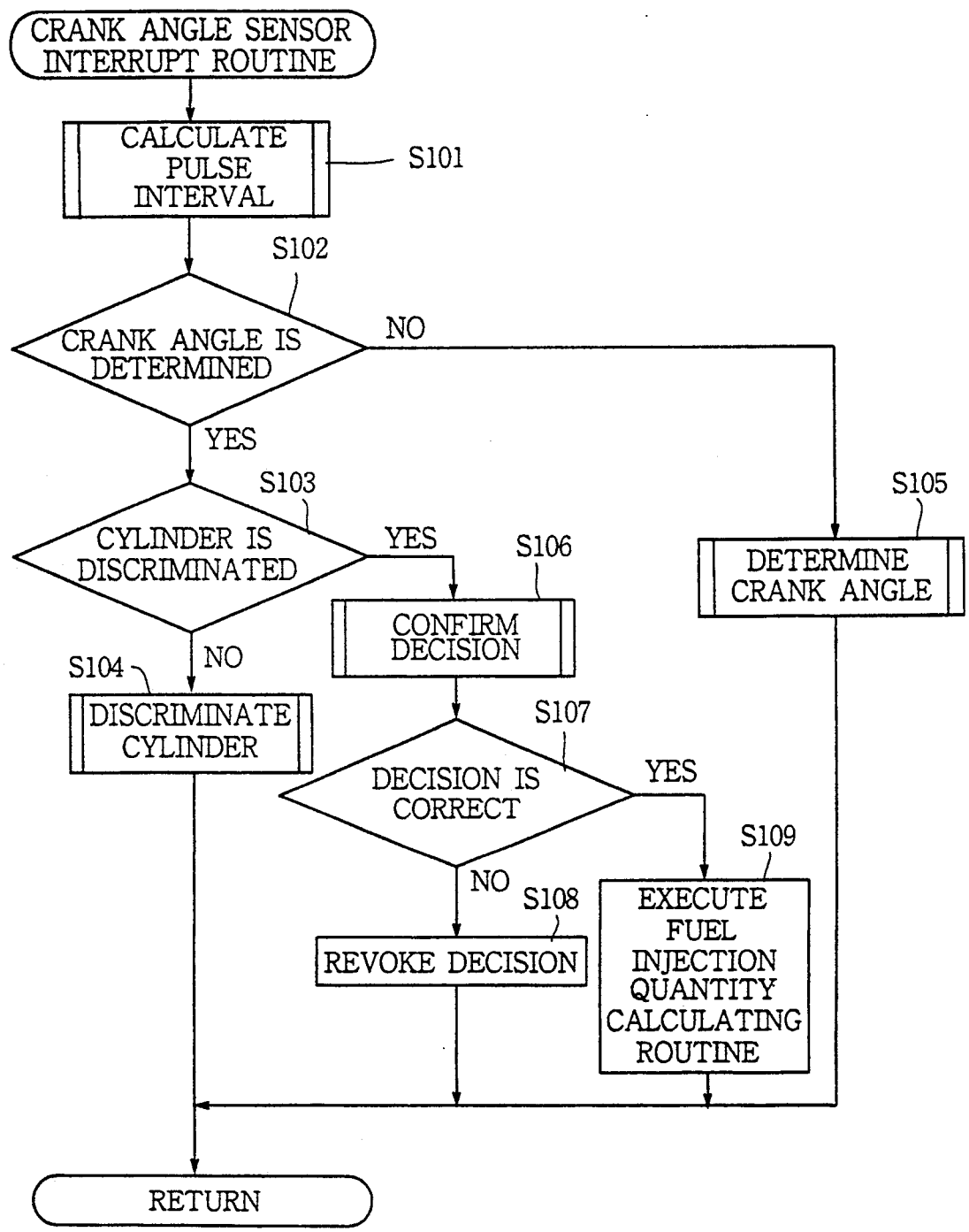
FIG. 4 is a flowchart showing a crank angle sensor interrupt routine.

Referring to FIG. 4, the interrupt routine is started when a pulse signal is applied from the pickup 26. At a step S101, an interval Tnew between a present pulse and a last pulse is calculated. At a step S102, it is determined whether the crank angle of the pulse is determined. When the crank angle is not yet determined, the program proceeds to a step S105 where a subroutine for determining the crank angle shown in FIG. 5 is executed.

Figure 5:
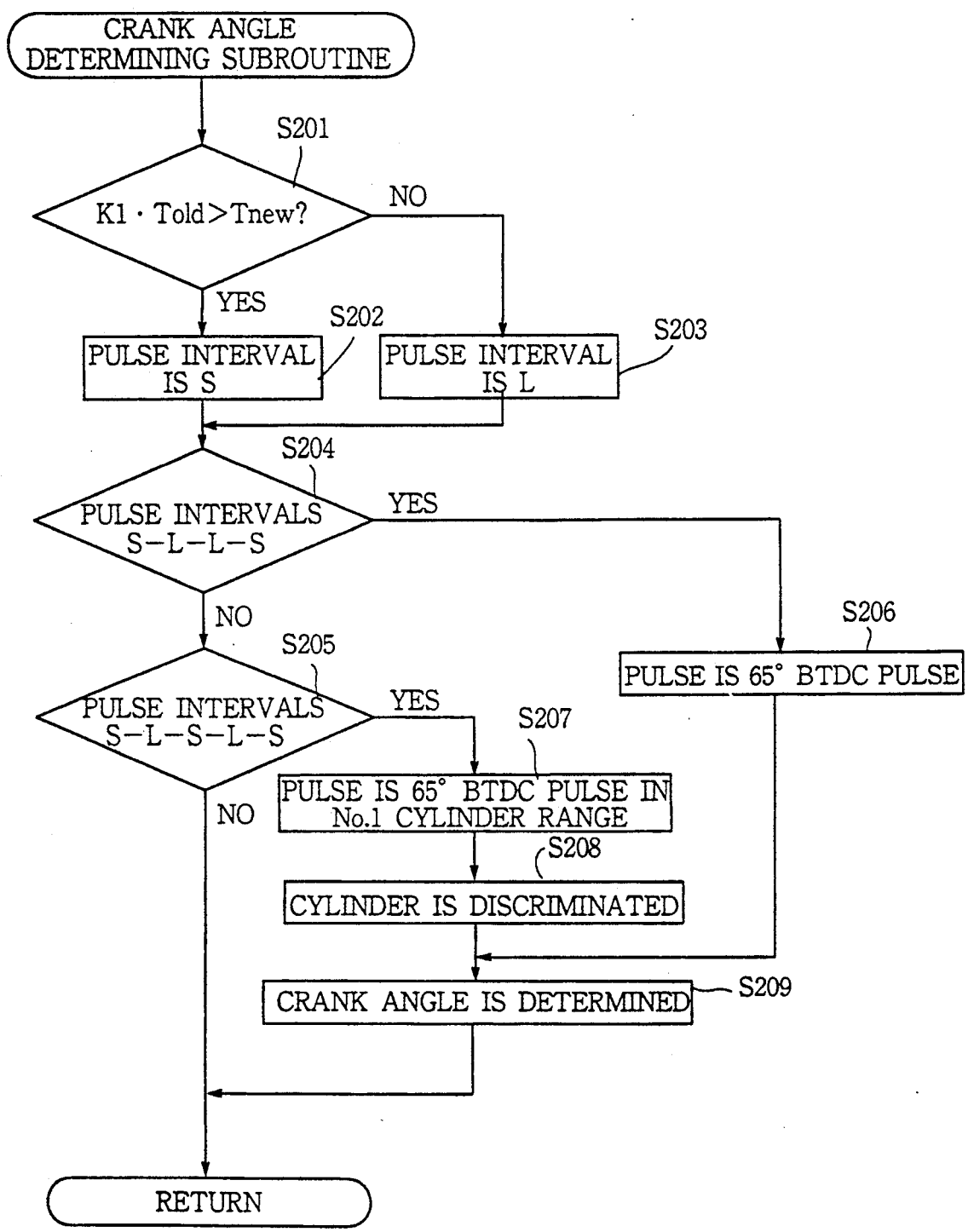
FIG. 5 is a flowchart showing a crank angle determining subroutine.

Referring to FIG. 5, at a step S201, the present pulse interval Tnew obtained at the step S101 of the interrupt routine and the last pulse interval Told obtained during the last routine are compared with each other in accordance with K1·Told>Tnew, where K1 is a coefficient. When the present interval Tnew is smaller than K1·Told, a step S202 determines that the pulse interval Tnew is short (S). When the present interval Tnew is larger than K1·Told, a step S203 determines that the pulse interval Tnew is long (L). At a step S204, it is determined whether a series of the last four pulses intervals are S-L-L-S. When the pulse intervals are in the S-L-L-S arrangement as shown by a period A in FIG. 3, the program goes to a step S206 where it is determined that the present pulse is a pulse generated at a crank angle of 65 degrees BTDC in one of No. 2 to No. 4 cylinders.

When the last four pulse intervals are in a different arrangement the program goes to a step S205 where a series of the last five pulse intervals are checked. When the arrangement is S-L-S-L-S as shown by a period B in FIG. 3, a step S207 determines that the present pulse is generated at a crank angle of 65 degrees BTDC of the No. 1 cylinder. Thus, the cylinder is discriminated at a step S208. The program proceeds to a step S209 where it is decided that the crank angle is determined. The routine is repeated until a 65 degree BTDC pulse is detected.

Referring back to FIG. 4, after the crank angle determining subroutine is terminated, the program proceeds from the step S102 to a step S103 where it is determined whether the cylinder is already discriminated. When it is determined at the step S208 of the crank angle determining subroutine that the pulse is the No. 1 cylinder, the program goes to a step S106, and otherwise to a step S104 to execute a cylinder discriminating subroutine shown in FIG. 6.

Figure 6:
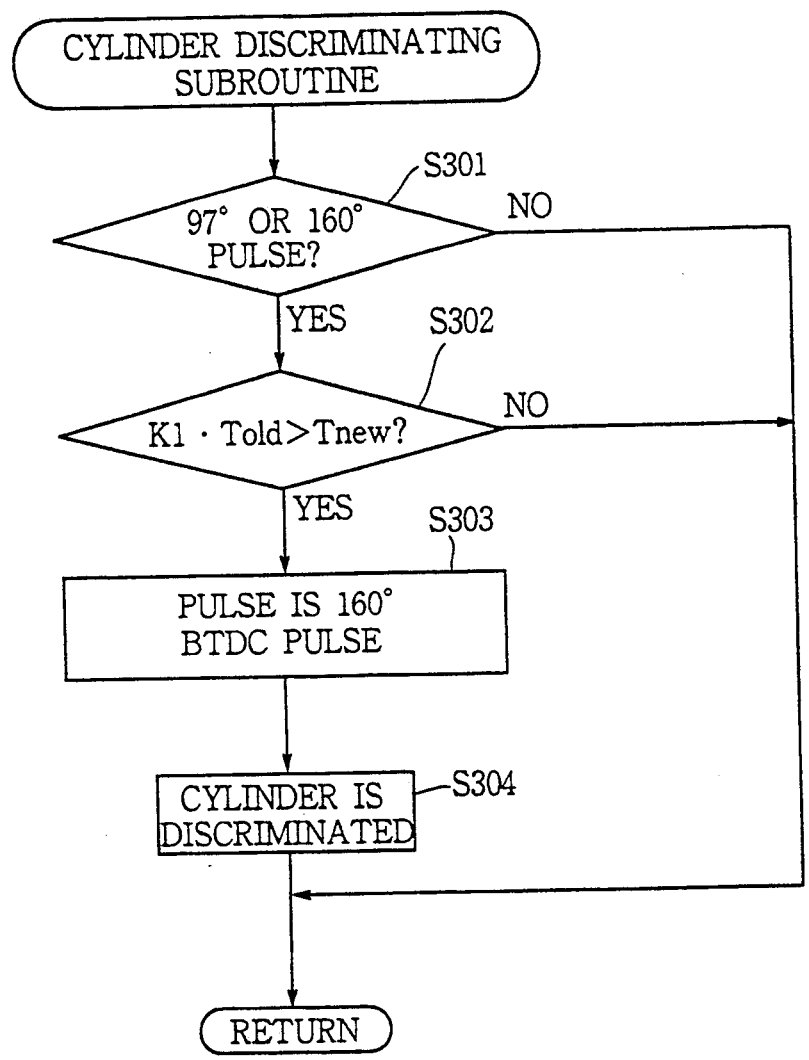
FIG. 6 is a flowchart showing a cylinder discriminating subroutine.

Referring FIG. 6, at a step S301 of the cylinder discriminating routine, it is determined whether the following pulse of the detected 65 degree BTDC pulse is a 97 degree BTDC pulse of No. 2 to No. 4 cylinders, or a 160 degree BTDC pulse of the No. 1 cylinder (FIG. 3).

The 65 degree BTDC pulse is already determined at the step S206 of the crank angle determining routine. If YES, the program goes to a step S302 where the pulse is specified either as the 97 degree BTDC pulse or the 160 degrees BTDC pulse. In other words, the present pulse interval Tnew is compared with the last pulse interval Told in accordance with K1·Told>Tnews. When the present interval is longer than the last interval Told, as shown by a period C in FIG. 3, it means that the pulse is the 97 degree BTDC pulse. The number of the cylinder is not yet known at this time. On the other hand, when the present pulse interval Tnew is shorter than the last pulse interval Told, as shown in a period D, it is determined at a step S303 that the present pulse is the 160 degree BTDC pulse of the No. 1 cylinder. Thereafter, the program goes to a step S304 where it is determined that the cylinder is discriminated. The steps S301 and S302 are repeated until the 160 degree BTDC pulse is detected.

When the cylinder is thus discriminated, the program proceeds from the step S103 to the step S106 in FIG. 4. At the step S106, the crank angle and the number of the cylinder determined in the subroutines are confirmed in accordance with a crank angle checking subroutine shown in FIG. 7. At a step S401, it is determined whether the present pulse is a 65 degree BTDC pulse dependent on the pulse determined as a 65 degrees BTDC pulse in the crank angle determining subroutine. When the answer is YES, it is determined at a step S402 whether K2·Told is equal to or larger than Tnew (K2·Told ≧ Tnew) where K2 is a coefficient relative to angles between the projections 22 and 23 in a sector of the disk and between the projection 22 and the projection 24 in the previous sector. If the present pulse interval Tnew is equal to or smaller than K2·Told, it is determined at a step S403 that the crank angle is correctly determined. On the other hand, when the Tnew is larger than K2·Told, it is determined at a step S404 that the crank angle is incorrectly determined.

Thereafter, the program proceeds to a step S107 of the interrupt routine where it is confirmed that the decision is correct in accordance with the result obtained in the crank angle checking subroutine. When the decision is correct, the routine for calculating the fuel injection quantity is started at a step S109. If the decision is incorrect, the erroneously determined crank angle and the cylinder number are revoked at a step 108, so that the interrupt routine for detecting the crank angle and discriminating the cylinder is executed again.

Figure 9:
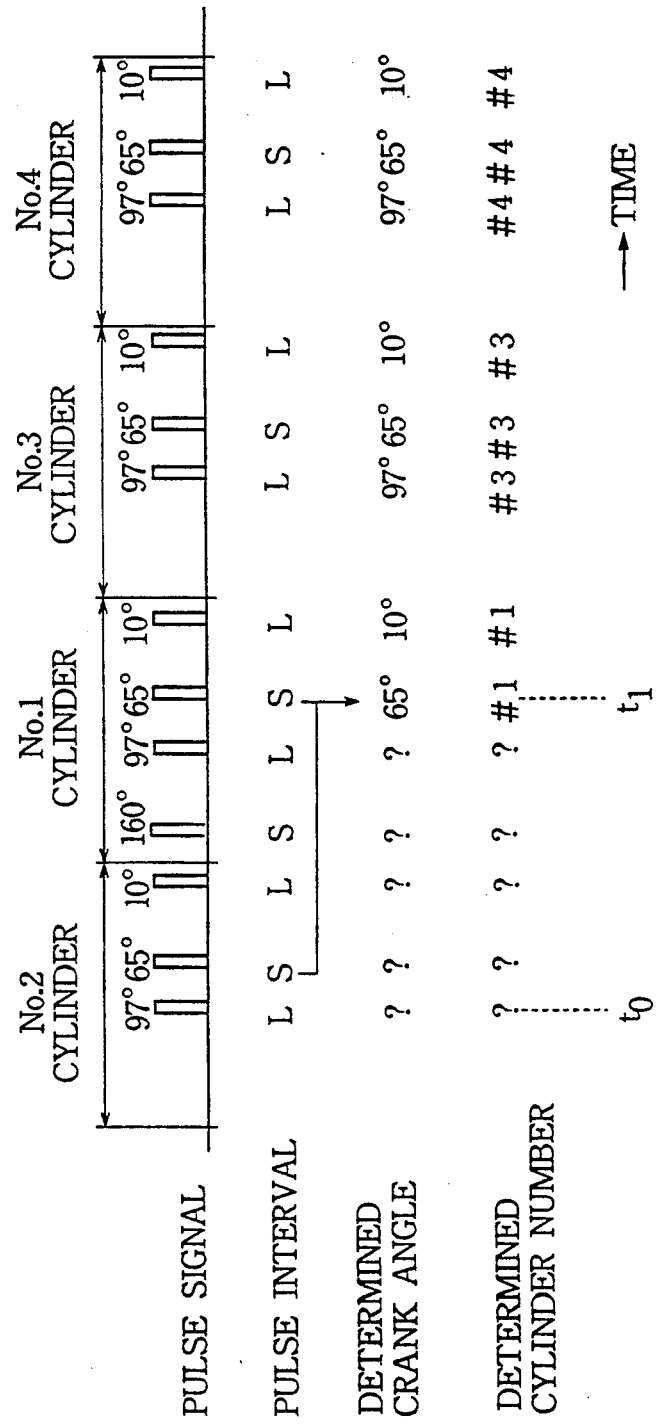

The operation of the system at the start of the engine is described hereinafter with reference to FIGS. 8 and 9. FIGS. 8 and 9 show pulse signals, the intervals between the pulse signals, the crank angle determined in the system and the numbers of the cylinders determined in the system. Question marks show that the crank angle and the cylinder number are not yet determined.

When a pulse signal from the crank angle detecting device 20 is applied to the CPU 34 of the control unit 30, the interrupt routine shown in FIG. 4 is executed. Every time a pulse is detected, it is determined whether the interval Tnew between the present pulse and the last pulse is shorter or longer than a pulse interval Told between the last pulse and a pulse previous to the last pulse. Thereafter, the crank angle determining subroutine is started.

Supposing that the first pulse applied at a time $t_0$ is the 97 degree BTDC pulse of the No. 4 cylinder as shown in FIG. 8, it is detected at the fifth pulse at a time $t_1$ that the last four pulse intervals show an arrangement of S-L-L-S. Hence, the fifth pulse is determined as the 65 degree BTDC pulse, although the cylinder number is not yet known. Thereafter, the following pulses are determined as 10 degrees BTDC, 97 degrees BTDC, 65 degrees BTDC, and so on in turn.

The cylinder discriminating subroutine shown in FIG. 6 is also executed. The seventh pulse applied at a time $t_2$ is a pulse subsequent to the 10 degree BTDC pulse. Since the interval Tnew is shorter than the last pulse interval Told, it can be determined that the seventh pulse is not the 97 degree BTDC pulse, but the 160 degrees BTDC pulse of the No. 1 cylinder. Thereafter, the number of the cylinder and the crank angle corresponding to each pulse are determined in the order of No. 1, 97 degree BTDC pulse, No. 1, 65 degree BTDC pulse, No. 1, 10 degree BTDC pulse, No. 3, 97 degree BTDC pulse and so on.

Figure 7:
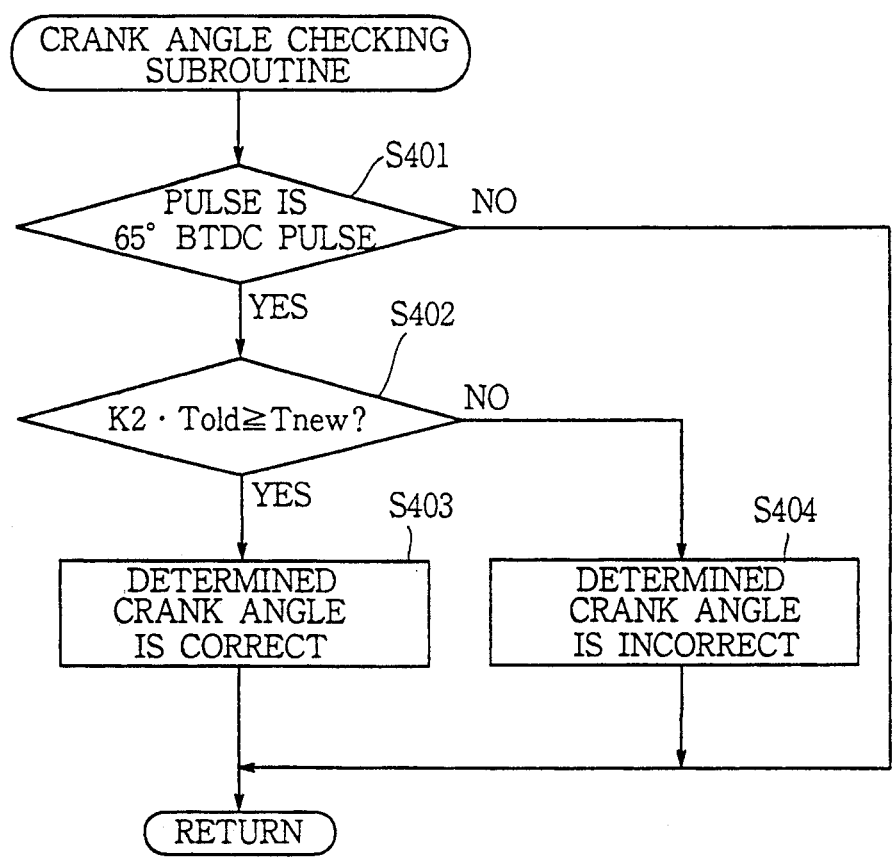
FIG. 7 is a flowchart showing crank angle checking subroutine.

When the crank angle and the number of the cylinder are thus determined, the decision is checked each time the 65 degree BTDC pulse is applied, in accordance with the crank angle checking routine shown in FIG. 7. When the decisions are correct, the quantity of the fuel to be injected is calculated. Thus, the fuel is correctly injected into the determined cylinder at 65 degrees BTDC.

FIG. 9 shows another example of the operation where the first pulse is the 97 degree pulse of the No. 2 cylinder. When the sixth pulse is applied at a time $t_1$, it is detected that the last five pulse intervals are S-L-S-L-S. Thus, the sixth pulse is determined as the 65 degree BTDC pulse of the No. 1 cylinder. Since the cylinder number is determined at the same time as the crank angle, it is unnecessary to execute the cylinder discrimination routine. The program accordingly takes less time than the example described in FIG. 8.

The present invention may be so modified that the number and the dispositions of the projections formed on the disc 21 of the crank angle detecting device 20 may be changed. The crank angle detecting device 20 may have an optical sensor having a phototransistor or an optical element. The present invention may be further applied to an engine having cylinders in numbers other than four.

From the foregoing it will be understood that the present invention provides a system for determining the crank angle and the number of the cylinder thereof in accordance with a change in intervals between pulses detected by the crank angle sensor. Therefore, although the timings of the pulses change due to the change in engine speed, the crank angle and the cylinder number are accurately detected, thereby increasing the reliability of the sensing device.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A crank angle and cylinder number detecting system for an engine having cylinders and a camshaft, the system comprising a rotary member operatively connecting with said camshaft, sensing means for detecting angular positions of said rotary member and for producing pulse signals, and control means responsive to said pulse signals and engine operating condition signals from sensors for deciding an injection timing of fuel from an injector into each cylinder, an improvement of the system which comprises:

a plurality of projections including a cylinder discriminating projection provided on a peripheral vicinity of said rotary member and unequally spaced from each other for producing said pulse signals by said sensing means;

first calculating means responsive to said pulse signals for detecting a pattern of time intervals formed by said pulse signals and for determining a crank angle; and second calculating means for calculating time intervals between said pulse signals and a pulse signal of said cylinder discriminating projections based on said crank angle determined by said first calculating means and for comparing degrees of the time intervals with each other, so as to discriminate a cylinder number of said engine so as to precisely control said injection timing even when engine speed suddenly fluctuates.

2. A crank angle and cylinder number detecting system for an engine having cylinders and a camshaft, the system comprising a rotary member operatively connecting with said camshaft, sensing means for detecting an angular position of said rotary member and for producing pulse signals, and control means responsive to said pulse signals and engine operating condition signals from sensors for deciding an injection timing of fuel from an injector into each cylinder, an improvement of the system which comprises:

a plurality of projections provided on a periphery of said rotary member and unequally spaced from each other;

calculating means responsive to said pulse signals for detecting a pattern of time intervals formed by said pulse signals and for determining a crank angle and a cylinder number of said engine so as to precisely control said injection timing even when engine speed suddenly fluctuates; and said projections are three and unequally spaced for deciding said crank angle and one projection for discriminating said cylinder number.

3. The system according to the claim 2, wherein said three projections are respectively spaced at 97 degrees, 65 degrees and 10 degrees before top dead center of each cylinder and said one projection is located at 160 degrees before said top dead center of the cylinder.

4. The system according to the claim 1, wherein said plurality of projections are sequentially used for deciding said crank angle and for discriminating said cylinder number.

5. A method for detecting a crank angle and a cylinder number of an engine having cylinders and a camshaft, a rotary member coaxially connected to an end of said camshaft, a detector for detecting angular positions of said rotary member and for producing pulse signals, and control means responsive to said pulse signals and engine operating condition signals from sensors for deciding an injection timing of fuel from an injector into each cylinder, a plurality of projections being provided on said rotary member and unequally spaced from each other, an improvement of the method comprising the steps of:

determining a pattern of time intervals of said pulse signals, and calculating a crank angle of said engine from said determined pattern and discriminating a cylinder number by comparing degrees of the time intervals with each other so as to precisely control said injection timing even when engine speed suddenly fluctuates.

* * * * *